(12) United States Patent
Berning et al.

(10) Patent No.: US 9,523,176 B2
(45) Date of Patent: Dec. 20, 2016

(54) ROAD MILLING MACHINE AND METHOD FOR MEASURING THE MILLING DEPTH

(71) Applicant: Wirtgen GmbH, Windhagen (DE)

(72) Inventors: Christian Berning, Brühl (DE); Dieter Simons, Buchholz (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 14/341,191

(22) Filed: Jul. 25, 2014

(65) Prior Publication Data

US 2015/0137577 A1    May 21, 2015

Related U.S. Application Data

(60) Continuation of application No. 13/557,729, filed on Jul. 25, 2012, now Pat. No. 8,807,867, which is a (Continued)

(30) Foreign Application Priority Data

Dec. 22, 2006  (DE) .......................... 10 2006 062 129

(51) Int. Cl.
  *E01C 23/088*  (2006.01)
  *E01C 23/12*  (2006.01)
  *G01B 5/18*  (2006.01)

(52) U.S. Cl.
  CPC ........... *E01C 23/088* (2013.01); *E01C 23/127* (2013.01); *G01B 5/18* (2013.01)

(58) Field of Classification Search
  CPC .................................................. E01C 23/088
  See application file for complete search history.

(56) References Cited

U.S. PATENT DOCUMENTS 3,158,945 A * 12/1964 Curlett .................. E01C 19/008
                                                                   172/2
3,423,859 A *  1/1969 Petersik et al. .................. 37/382
(Continued)

FOREIGN PATENT DOCUMENTS

CA    2548521 A1    6/2006
DE    3812809 A1   11/1989
(Continued)

OTHER PUBLICATIONS

Ex. A1: German Office Action in DE 102005004211.0-25, 3 pp. (not prior art).
(Continued)

*Primary Examiner* — Matthew D Troutman
(74) *Attorney, Agent, or Firm* — Lucian Wayne Beavers; Patterson Intellectual Property Law PC

(57) ABSTRACT

A method is provided for measuring the milling depth of a road milling machine, the machine being operative to mill a ground surface with a milling roller lowered to a milling depth to create a milling track, the machine including at least one side plate located to at least one side of the milling roller to engage an untreated ground surface, and the machine including a stripping plate operative to be lowered onto the milling track generated by the milling roller. The method includes measuring the milling depth of the milling track, the measuring including detecting a measurement value of a ground engaging sensor engaging the milling track.

25 Claims, 5 Drawing Sheets

Related U.S. Application Data division of application No. 12/003,094, filed on Dec. 20, 2007, now Pat. No. 8,246,270.

(56) References Cited

U.S. PATENT DOCUMENTS

| | | | | |
|---|---|---|---|---|
| 3,598,027 | A * | 8/1971 | Swisher, Jr. | 404/76 |
| 3,674,094 | A * | 7/1972 | Kuntz | 172/4.5 |
| 3,946,506 | A * | 3/1976 | Snow et al. | 37/382 |
| 4,029,165 | A | 6/1977 | Miller et al. | |
| 4,041,623 | A * | 8/1977 | Miller et al. | 37/382 |
| 4,103,973 | A * | 8/1978 | Cutler | 299/39.6 |
| 4,139,318 | A * | 2/1979 | Jakob et al. | 404/90 |
| 4,213,719 | A | 7/1980 | Swisher, Jr. et al. | |
| 4,247,126 | A | 1/1981 | Claxton | |
| 4,270,801 | A | 6/1981 | Swisher, Jr. et al. | |
| 4,325,580 | A * | 4/1982 | Swisher et al. | 299/39.8 |
| 4,808,026 | A | 2/1989 | Clarke, Jr. et al. | |
| 4,938,537 | A * | 7/1990 | Rife, Jr. | E01C 23/088 172/112 |
| 4,943,119 | A * | 7/1990 | Zarniko et al. | 299/1.5 |
| 5,092,659 | A * | 3/1992 | Grathoff | 299/39.2 |
| 5,098,119 | A | 3/1992 | Williams et al. | |
| 5,309,407 | A * | 5/1994 | Sehr et al. | 367/96 |
| 5,315,770 | A * | 5/1994 | Campbell | 37/96 |
| 5,318,378 | A * | 6/1994 | Lent | E01C 23/088 404/75 |
| 5,378,081 | A * | 1/1995 | Swisher, Jr. | 299/39.5 |
| 5,533,790 | A | 7/1996 | Weiland | |
| 5,538,266 | A | 7/1996 | Martin et al. | |
| 5,588,776 | A * | 12/1996 | Swisher et al. | 404/72 |
| 5,607,205 | A * | 3/1997 | Burdick et al. | 299/1.5 |
| 5,639,181 | A * | 6/1997 | Swisher, Jr. | 299/39.1 |
| 5,893,677 | A * | 4/1999 | Haehn et al. | 404/90 |
| 5,984,420 | A * | 11/1999 | Murray et al. | 299/1.5 |
| 6,152,648 | A * | 11/2000 | Gfroerer et al. | 404/84.05 |
| 6,371,566 | B1 * | 4/2002 | Haehn | 299/1.5 |
| 6,385,519 | B2 | 5/2002 | Rocke | |
| 7,108,450 | B2 * | 9/2006 | Grubba | E01C 19/187 404/101 |
| 7,144,192 | B2 * | 12/2006 | Holl | E01C 23/088 404/122 |
| 7,316,520 | B2 * | 1/2008 | Grubba | 404/84.05 |
| 7,530,641 | B2 * | 5/2009 | Berning | B28D 1/18 299/1.5 |
| 7,946,788 | B2 * | 5/2011 | Jurasz et al. | 404/84.8 |
| 8,113,592 | B2 | 2/2012 | Busley et al. | |
| 8,424,972 | B2 | 4/2013 | Berning et al. | |
| 2002/0047301 | A1 * | 4/2002 | Davis | 299/1.5 |
| 2005/0077691 | A1 | 4/2005 | Witters | |
| 2005/0158120 | A1 * | 7/2005 | Holl | E01C 23/088 404/94 |
| 2005/0207841 | A1 * | 9/2005 | Holl | E01C 23/088 404/94 |
| 2006/0076821 | A1 | 4/2006 | Troudt et al. | |
| 2007/0150148 | A1 * | 6/2007 | Rasmussen | 701/50 |
| 2007/0286678 | A1 * | 12/2007 | Berning et al. | 404/90 |
| 2008/0152428 | A1 * | 6/2008 | Berning et al. | 404/84.1 |
| 2008/0153402 | A1 * | 6/2008 | Arcona et al. | 451/352 |
| 2008/0246328 | A1 | 10/2008 | Mannebach et al. | |
| 2008/0315666 | A1 | 12/2008 | Von Schonebeck et al. | |
| 2009/0108663 | A1 * | 4/2009 | Berning et al. | 299/1.5 |
| 2010/0109422 | A1 * | 5/2010 | Busley | B60G 3/01 299/39.6 |
| 2011/0206456 | A1 * | 8/2011 | Jurasz et al. | 404/75 |

FOREIGN PATENT DOCUMENTS

| | | |
|---|---|---|
| DE | 4017107 A1 | 3/1991 |
| DE | 19617442 C1 | 1/1998 |
| DE | 100558980 A1 | 8/2001 |
| DE | 10357074 B3 | 5/2005 |
| EP | 0547378 A1 | 6/1993 |
| EP | 0692183 A1 | 1/1996 |
| EP | 1154075 A2 | 11/2001 |
| GB | 2313347 A | 11/1997 |
| JP | 2279805 A | 11/1990 |
| WO | 9308003 A1 | 4/1993 |
| WO | 02057112 A1 | 7/2002 |
| WO | 2007031531 A1 | 3/2007 |

OTHER PUBLICATIONS

Ex. A2: Summary of A1, 2 pp. (not prior art).
Ex. B1: Third Party Observation—EP 20060793470, 4 pp. (Jan. 21, 2013) (not prior art).
Ex. B2: Summary of B1, 3 pp. (not prior art).
Ex.: C1: Third Party Observation—EP 20060793470, 12 pp. (Sep. 3, 2014) (not prior art).
Ex. C2: Summary of C1, 5 pp. (not prior art).
Ex. D: IPRP from PCT/EP2006/066305, 10 pp. (not prior art).
Ex. E: Written Opinion of the ISA from PCT/EP2006/066305, 9 pp. (not prior art).
Co-pending U.S. Appl. No. 14/683,273, filed Apr. 10, 2015, 29 pp. (not prior art).
European Search Report in corresponding European Patent Application No. EP 13 15 4680, dated Jun. 30, 2016, 3 pp. (not prior art).

* cited by examiner

ROAD MILLING MACHINE AND METHOD FOR MEASURING THE MILLING DEPTH

RELATED APPLICATIONS

The present application claims the priority of the German Patent Application No. 10 2006 062 129.8 of Dec. 22, 2006, the disclosure of which is herewith incorporated herein by reference. This application is also a divisional of U.S. patent application Ser. No. 12/003,094 filed Dec. 20, 2007, the disclosure of which is incorporated herein by reference.

BACKGROUND OF THE INVENTION

Field of the Invention

The invention refers to a self-propelled road milling machine, especially a cold milling machine, as well as a methods for measuring the milling depth.

Description of Related Art

With such road milling machines, the machine frame is supported by a track assembly comprising wheels or caterpillar tracks connected to the machine frame through lifting columns, the lifting columns allowing to maintain the machine frame in a horizontal plane or in parallel to the ground or under a predetermined longitudinal and/or transversal inclination.

A milling roll for working a ground or traffic surface is supported at the machine frame.

Near the front end sides of the milling roll height-adjustable side plates are provided as edge protectors at an outer wall of the road milling machine, which side plates, in operation, rest on the ground or traffic surface at the lateral non-milled edges of the milling track. Behind the milling roll, seen in the travelling direction, a height-adjustable stripping means is provided which, in operation, may be lowered into the milling track formed by the milling roll to strip off milling material remaining in the milling track. Further, the road milling machine has a control means for controlling the milling depth of the milling roll.

It is a problem with known road milling machines that the milling depth can not be controlled accurately enough and that, for this reason, the milling depth has to be measured repeatedly by hand during the milling operation. Especially in cases where a hard traffic surface, e.g. concrete, is milled, the tools are worn heavily so that the milling depth set is corrupted by the decreasing diameter of the cutting circle. For example, the wear of the tools, when milling concrete, can cause a difference in the milling radius of 15 mm after only a few 100 m, so that the measuring of an adjustment of side plates, for example, with respect to the machine frame is not sufficiently accurate. If the milling depth is insufficient, a time-consuming reworking of the milling track has to be carried out. Should the milling track be too deep, more building material has to be applied afterwards in order to achieve the desired ground or traffic surface level.

SUMMARY OF THE INVENTION

It is an object of the present invention to improve the accuracy of measuring the milling depth during the operation of a road milling machine and to thereby minimize deviations from a predetermined milling depth.

The invention advantageously provides that at least one measuring means detects the lifting of a first sensor means resting on the ground or traffic surface and/or the lowering of a second sensor means to the bottom of the milling track, the lifting or lowering being effected in correspondence with the present milling depth. From the measured values supplied by the at least one measuring means, the control means can determine the milling depth at the level of the measuring means of the milling roll or the second sensor means.

Here, the measurement is effected preferably at the level of the stripping means arranged closely behind the milling roll, or immediately behind the stripping means, if a separate sensor means is provided.

Using the stripping means as a sensor means is advantageous in that no measuring errors are caused by some unevenness in the milling track. It is another advantage that the stripping means is protected against wear at its bottom edge.

As an alternative, the control means can use the measurement values of the at least one measuring means to determine the current milling depth of the milling roll at the level of the milling roll axis. Preferably, this is done by a calculation that may also take into account an inclined position of the machine frame.

The measuring means are preferably formed by position sensing means. In one embodiment it is provided that the first sensor means is formed by at least one of the side plates arranged on either side at the front sides of the milling roll so as to be height-adjustable and pivotable with respect to the machine frame. The side plates rest on the ground or traffic surface or are pressed against these, so that a change of their position relative to the machine frame during operation allows for an exact detection of the milling depth, if a measurement of the change of the position of a second sensor means is performed additionally in the milling track relative to the machine frame.

Also for side plates, there is an advantage that their bottom edges are protected against wear.

Here, the measuring means may comprise cable lines coupled with the side plates and/or the stripping means, and associated cable-line sensors as the position sensors which measure the changes of the position of the side plates and the stripping means relative to the machine frame or the relative displacement of at least one of the side plates in relation to the stripping means or the second sensor means.

Preferably, the cable lines coupled with the side plates and the stripping means are arranged transversely to the milling track in a substantially vertical plane extending approximately at the level of the stripping means.

Hereby, it can be avoided that a measurement error is caused by using different reference planes for the measurement at the side plates with respect to the measurement at the stripping plate.

To achieve this, it may be provided that a cable line is coupled on the one hand with the stripping means and, on the other hand, with at least one of the side plates via a guide roller, such that a cable-line sensor immediately measures the milling depth, e.g. at the guide roller.

In another alternative it may be provided that the side plate has a respective measuring means at the side edges facing the side plates, which measures the relative displacement of the stripping means with respect to the at least one adjacent side plate or the relative displacement of at least one side plate with respect to the stripping means.

According to another alternative embodiment, the stripping means may include at least one height-adjustable beam as the first sensing means, which is guided vertically and linearly in the stripping means and extends transversely to the travelling direction, said beam resting on the ground or traffic surface beside the milling track, the position of the beam relative to the stripping means, preferably with respect to height and/or inclination, being measurable by the measuring means.

Due to gravity, the side plates may rest on the edges of the ground or traffic surface beside the milling track milled by the milling machine, or they may alternatively be pressed on the edges by hydraulic means.

The stripping means may also be pressed on the surface of the milling track using hydraulic means.

The hydraulic means for pressing the side plates on the ground or traffic surface or for pressing the stripping means on the bottom of the milling track may comprise integrated position sensing systems.

For lifting or lowering the side plates and/or the stripping means, a plurality of, preferably two respective piston/cylinder units with integrated position sensing systems may be provided, whose position sensing signals are used by the control means to calculate the current milling depth from the relative difference between the positions of the stripping means and the at least one first sensor means.

The control means that receives the position sensing signals from the measuring means is adapted to automatically control the lifted condition of the rear lifting columns, seen in the travelling direction, to establish parallelism between the machine frame and the ground or traffic surface at a desired milling depth.

The side plates resting on the traffic surface so as to be pivotable with respect to the machine frame may comprise measuring means spaced apart in the travelling direction, the control means being capable to measure the longitudinal and/or the transversal inclination of the machine frame with respect to the ground or traffic surface from the difference between the measurement signals from the side plates and the stripping means.

The front and/or rear lifting columns may include a position sensing system to detect the lifted condition. The control means that receives the position sensing signals from the measuring means can control the condition of all lifting columns such that the machine frame has a predetermined inclination or a predetermined travel-distance-dependent transverse inclination across the travelling direction.

Preferably, the current set value for the milling depth of the milling roll is adjusted using the front lifting columns.

The following is a detailed description of a preferred embodiment of the invention with reference to the accompanying drawings.

DESCRIPTION OF THE PREFERRED EMBODIMENTS

Figure 1:
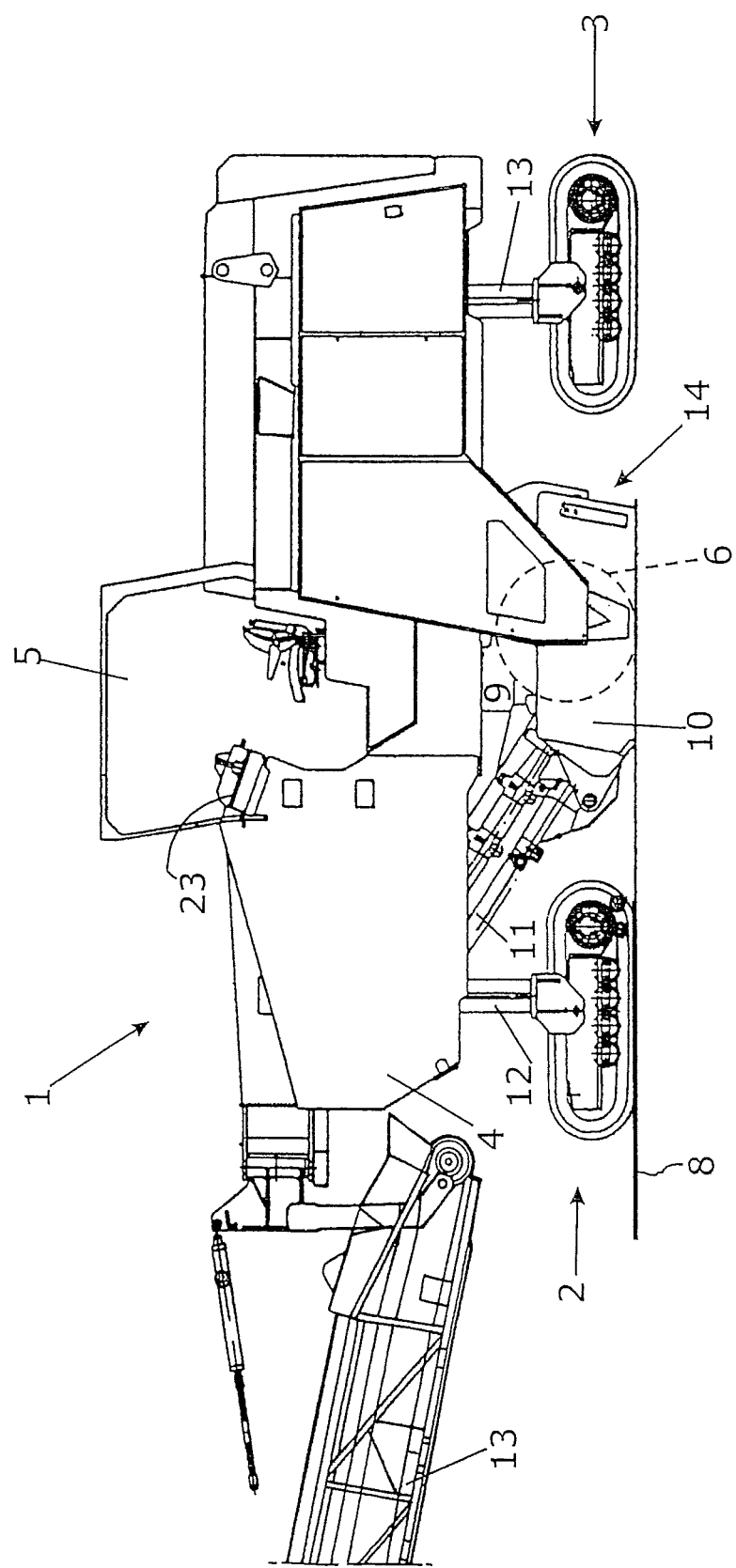
FIG. 1 shows a cold milling machine.

The road milling machine illustrated in FIG. 1 comprises a machine frame 4 supported by a track assembly having two front chain tracks 2 and at least one rear chain track 3. The chain tracks 2, 3 are connected with the machine frame 4 via lifting columns 12, 13. It is understood that wheels may be used instead of the chain tracks 2, 3.

Using the lifting columns 12, 13, the machine frame 4 can be lifted or lowered or moved to take a predetermined inclined position with respect to the ground or traffic surface 8. The milling roll 6 supported in the machine frame 4 is enclosed by a roll case 9 which is open at the front, seen in the travelling direction, towards a conveyor belt 11 that conveys the milled material in a front part of the machine frame 4 to a second conveyor means 13. The second conveyor means 13 with which the milled material may be delivered onto a truck, for example, is not fully illustrated in FIG. 1 because of its length. Behind the milling roll 6, a height-adjustable stripping means 14 is arranged which, in operation, has a stripping plate 15 engage into the milling track 17 formed by the milling roll 6 and strip the bottom of the milling track 17 so that no milled material is left in the milling track 17 behind the stripping plate.

Above the milling roll 6, a driver's stand 5 with a control panel for the vehicle operator is provided for all control functions of the driving and milling operations. It also includes a control means 23 for controlling the milling depth of the milling roll 6.

The side plates 10, arranged on either side near the front end of the milling roll 6, and the stripping means 14 are provided with measuring means 16 that allow the determination of the current milling depth at the level of the stripping means 14 or the calculation of the milling depth at the level of the rotational axis of the milling roll. Here, the milling depth is determined in a plane orthogonal to the ground or traffic surface, which plane is parallel to the rotational axis of the milling roll and includes the rotational axis.

The position of a first sensor means, e.g. the side plates 10, on the ground or traffic surface 8 and/or the lowering of a second sensor means, e.g. the stripping means, can thus be detected. Measuring means 16, preferably formed by position sensing means, measure the displacements of the sensor means, e.g. the side plates 10 or a beam 20 or the stripping plate 15, with respect to the machine frame 4 or relative to each other.

Figure 2:
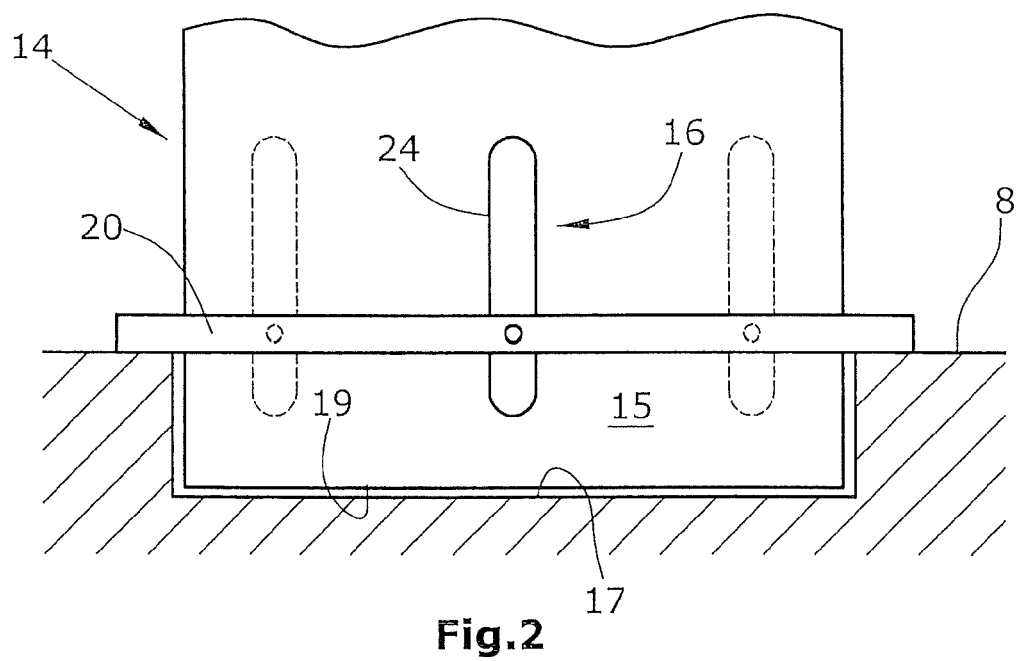
FIG. 2 illustrates a first sensor means attached to the stripping plate.

The embodiment illustrated in FIG. 2 shows a beam 20 as the sensor means, resting on the ground or traffic surface 8 and guided at the stripping plate 15 of the stripping means in a slot 24 extending linearly and orthogonally to the bottom edge 19 of the stripping plate 15. It is understood that two mutually parallel slots 24 can be provided in the stripping plate 15 or that the beam 20, serving as the sensing means, can be guided in a different manner so as to be height-adjustable at the stripping means 14. The measuring means 16, provided in the form of a position sensing means, detects the displacement of the beam 20 with respect to the stripping means 14. Should two horizontally spaced slots 24 be used, it is possible to separately detect the milling depth on the left side of the milling track 17 and on the right side of the milling track 17. Moreover, this offers the possibility to determine an inclination of the machine frame 4 with respect to the ground or traffic surface 8.

Figure 3:
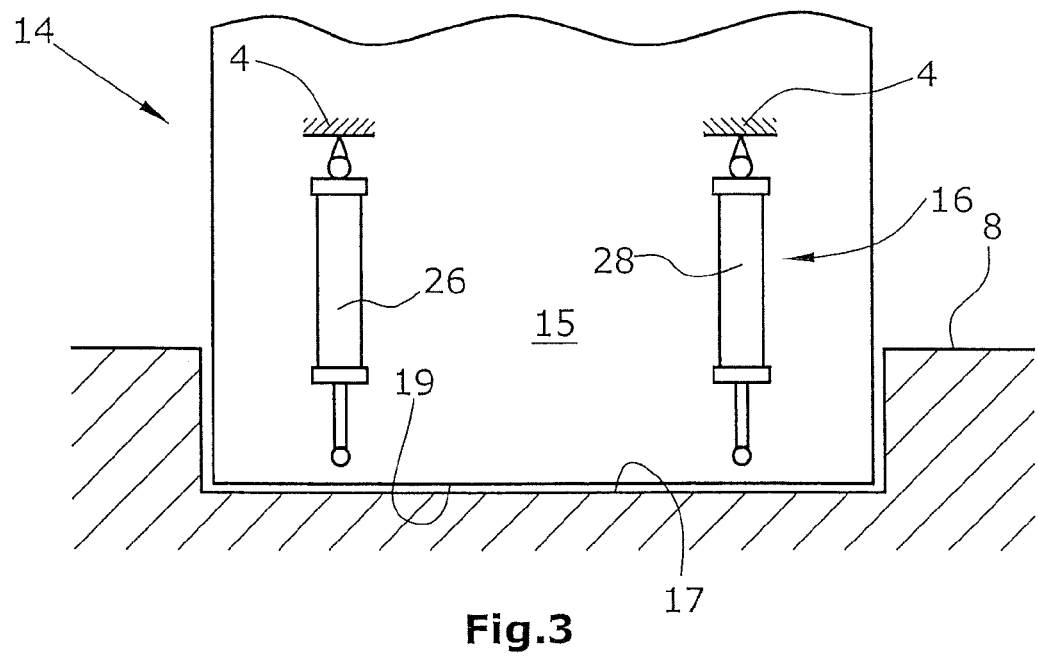
FIG. 3 shows two piston/cylinder units for lifting or lowering the stripping plate of a stripping means.

FIG. 3 illustrates another embodiment wherein the stripping plate 15 of the stripping means 14 can be lifted or lowered by means of hydraulic means. The hydraulic means are formed by piston/cylinder units 26, 28 with an integrated position sensing system. This means that the piston/cylinder units 26, 28 not only allow for the stroke movement of the stripping means, but moreover generate a position signal.

As is evident from FIG. 3, the piston/cylinder units 26, 28 have one end connected to the machine frame 4 and the other end connected to the stripping plate 15.

Figure 4:
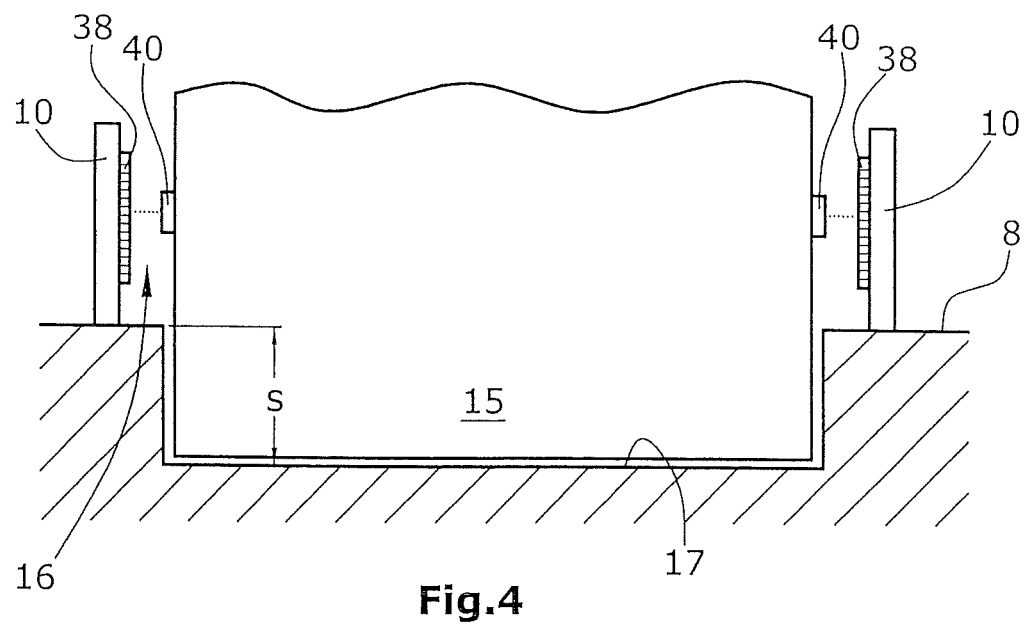
FIG. 4 illustrates an optical device for measuring the positional difference between the side plates and the stripping means.

FIG. 4 illustrates an embodiment, wherein the relative movement between the side plates 10 and the stripping plate 15 is measured directly in order to detect the milling depth of the milling track 17. To achieve this, elements 38, 40 of the measuring means 16 are provided, e.g., at the side plates 10 and opposite thereto at the stripping plate 15, which elements allow for the detection of the relative displacement of the stripping plate 15 with respect to the side plates 10. This displacement corresponds to the milling depth s in FIG. 4. For example, such a measuring means, which measures relative displacements, may be formed by an optical system, e.g. by reading a scale with an optical sensor, or by an electromagnetic or inductive system.

Figure 5:
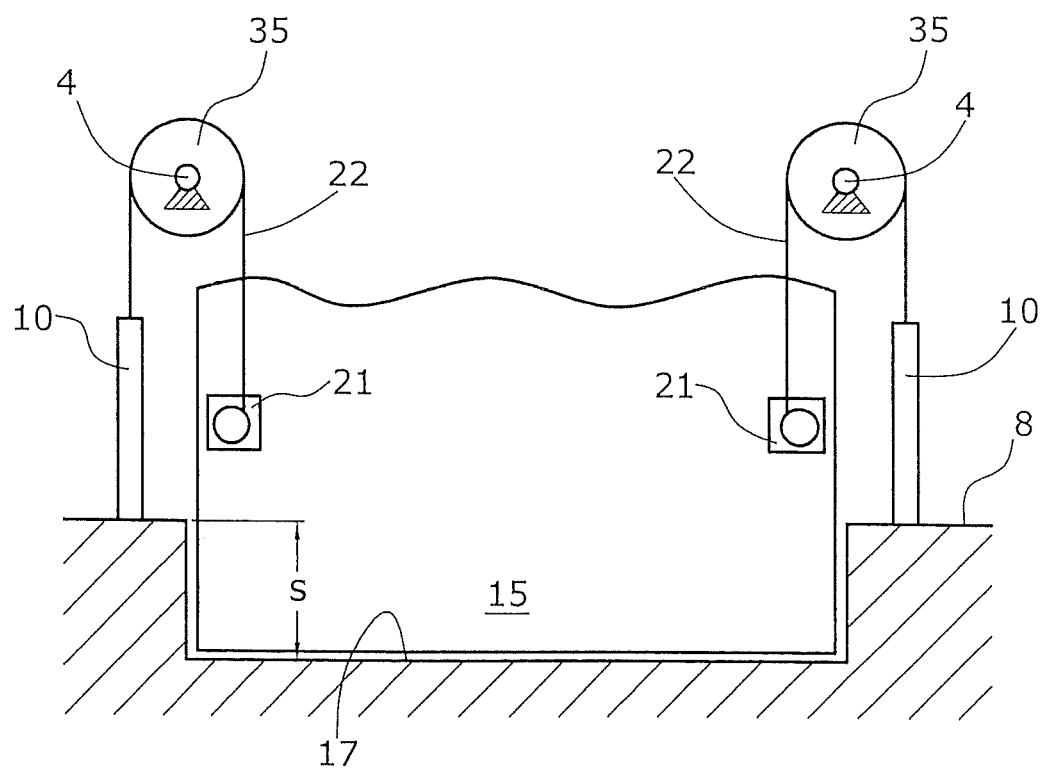
FIG. 5 shows a cable line measuring means provided between the side plates and the stripping means.

As an alternative and as illustrated in FIG. 5, the relative position sensing system between the side plates 10 and the stripping plate 15 may also be formed by a cable line 22 in combination with a cable-line sensor 21. the cable line 22 is coupled with the stripping plate 15 of the stripping means 14 on the one hand and, on the other hand, with at least one of the side plates 10 via a guide roller 35, so that the signal from the cable-line sensor 21 can immediately indicate the value of the current milling depth.

The side plates 10 themselves can be used as first sensor means by monitoring their position with respect to the machine frame 4 or the second sensor means by means of a cable line and a cable-line sensor or by means of piston/cylinder units 30, 32 with integrated position sensing means.

For example, the measuring means can also measure the displacement of the side plates 10 with respect to the machine frame 4. Should two measuring means be used, one in front of the side plates 10 and one behind the same, seen in the travelling direction, it is also possible to determine the longitudinal inclination of the machine frame 4 with respect to the ground or traffic surface 8 or to also determine the transverse inclination of the machine frame 4 by a comparison of the measured values for both side plates 10 on both sides of the milling roll 6.

Figure 6:
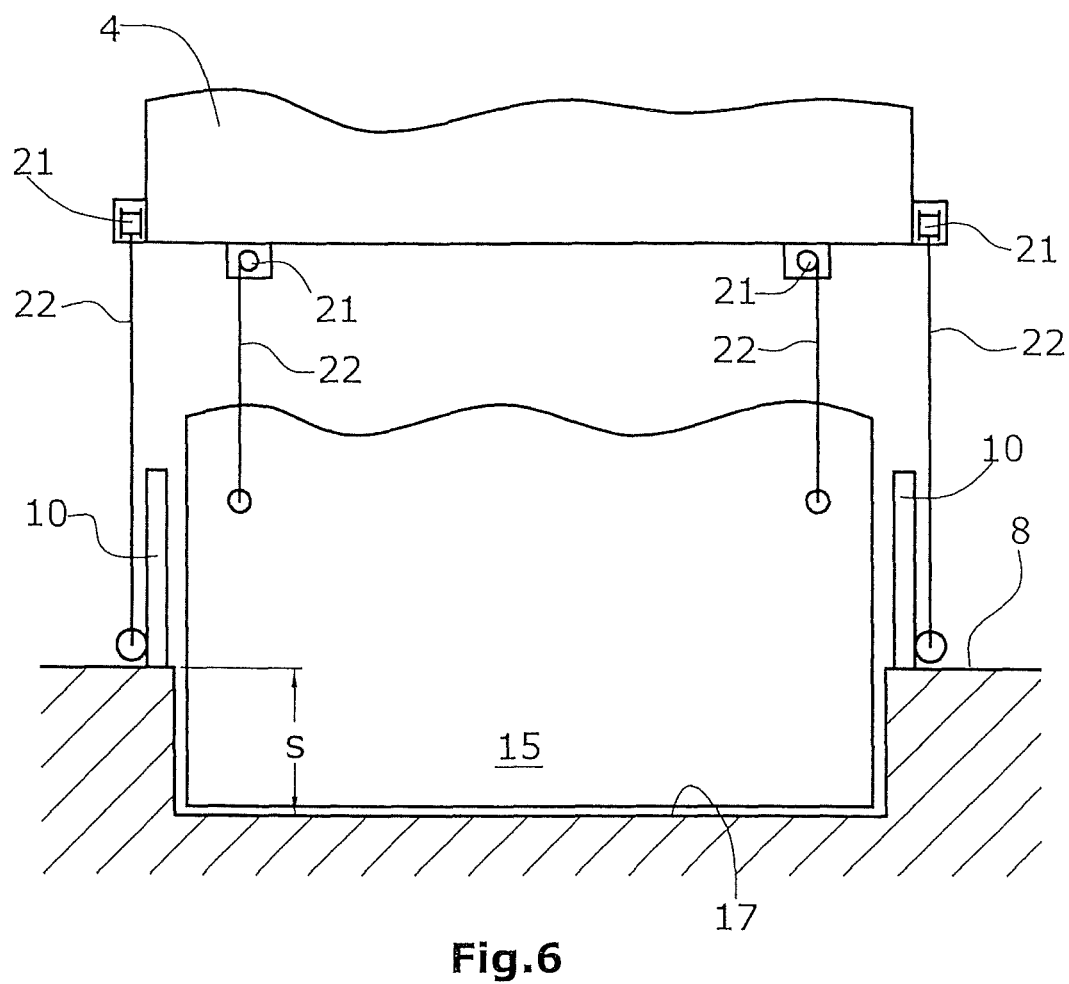
FIG. 6 illustrates a preferred embodiment.

FIG. 6 illustrates a preferred embodiment, wherein cable lines 22 comprising cable-line sensors 21 mounted to the machine frame 4 are arranged on both sides of the stripping means 15. On either side of the machine, the side plates 10 are also provided with cable lines 22 and cable-line sensors 21 fastened at the machine frame 4. The milling depth s is determined from the difference between the measured values of the cable-line sensors 21 for the side plates 10 and the cable-line sensors 21 of the stripping means 15. Here, the measurement should preferably be made in the same substantially vertical plane in order to avoid measurement errors.

Figure 7A:
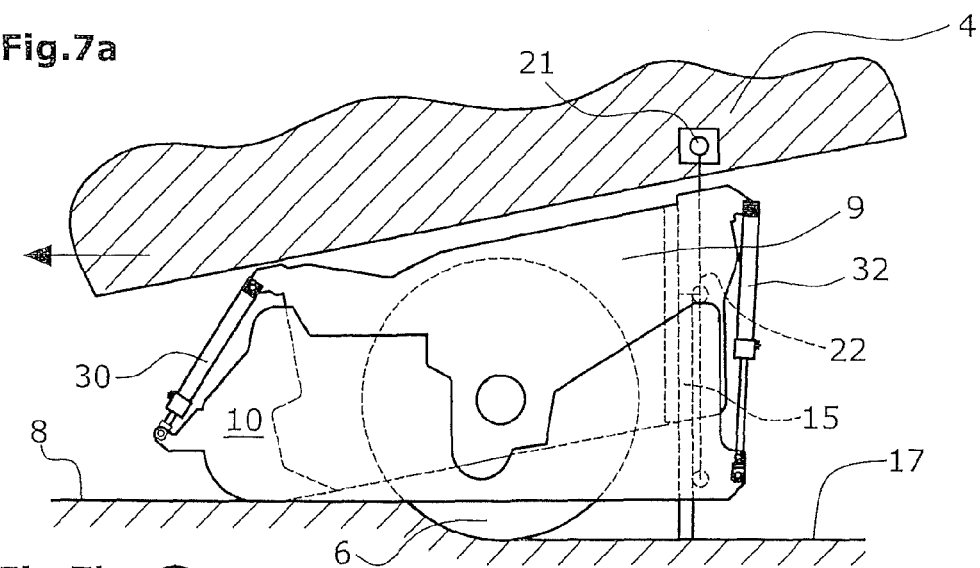
FIGS. 7a, b, c are schematic illustrations of the measurement error occurring at the stripping plate of the stripping means in the absence of parallelism between the machine frame and the ground or traffic surface.
Figure 7B:
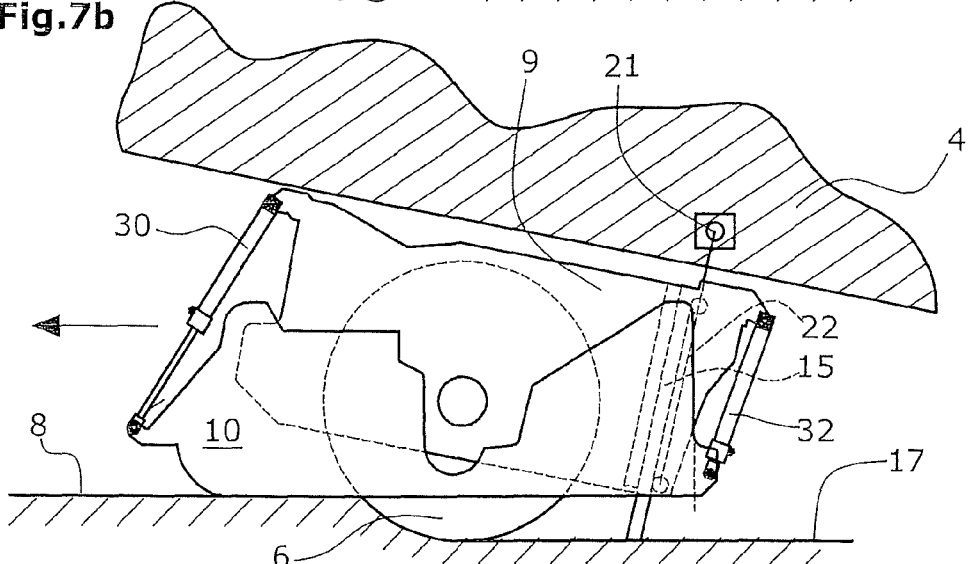
Figure 7C:
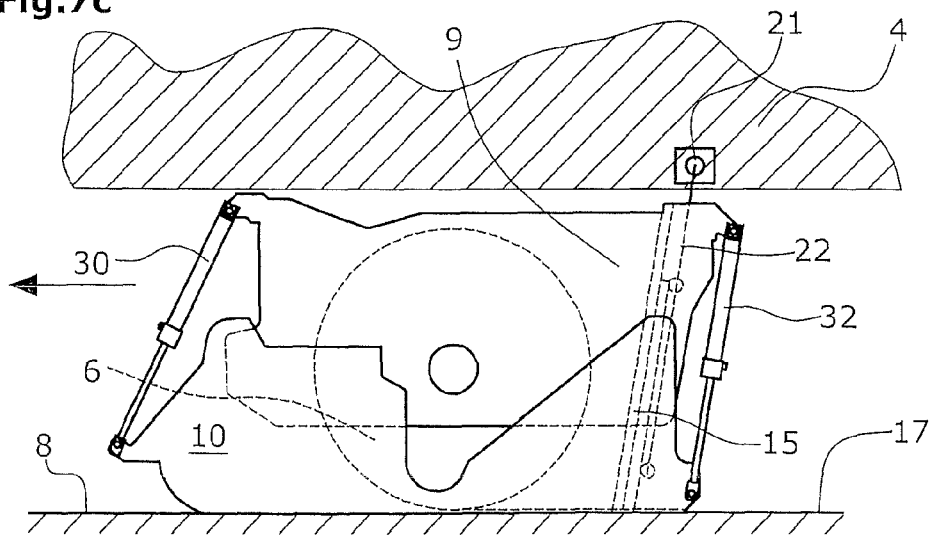

FIGS. 7a to 7c illustrate the cable-line sensors 21 for the side plates 10 and the stripping plates 14, the drawings only indicating one cable-line sensor 21, since the cable-line sensors are arranged one behind the other in substantially the same plane.

FIGS. 7a, b, c are to illustrate the case where the ground or traffic surface 8 is not parallel to the machine frame 4, the measured milling depth value indicated by the measuring means having to be corrected because of an angle error, because a longitudinal inclination of the machine frame 4 corrupts the measurement signal at the level of the stripping plate 15 or a second sensor means near the stripping means 14. Due to the fixed geometrical relations, i.e. the distance of the stripping plate 15 from the rotational axis of the milling roll 6, the measured milling depth value can be corrected, knowing the angular deviation from the horizontal in the travelling direction, and the current milling depth at the level of the milling roll axis can be calculated. The angular deviation in the travelling direction may be determined, for example, from the position of the lifting columns 12, 13 of the caterpillar track assemblies 2, 3 or the piston/cylinder units 30, 32.

It is further evident from FIGS. 7a to c, to which extent the side plates 10 are pivotable with respect to the machine frame 4. Since the piston/cylinder units 30, 32 are also provided with position sensing systems, these measuring signals may be used as an alternative to cable-line sensors 21 to determine the distance of the side plates 10 from the machine frame 4.

FIG. 7c illustrates the position of the at least one side plate 10 for a ground-parallel position of the machine frame 4. The stripping plate 15 illustrated in FIGS. 7a to 7c is located at the roll case 9, so that the distance of the stripping plate 14 from the rotational axis to the milling roll 6 can be determined unambiguously in order to allow for a calculation of the milling depth correction should the machine frame 4 not be parallel to the ground.

The control means 23 can calculate the current milling depth at the level of the milling roll axis from the position sensing signals received, and it can possibly also generate a control signal for a vertical adjustment of the milling roll 6.

Preferably, the control means 23 can automatically control the lifted condition of the at least one rear lifting column 13, seen in the travelling direction, to establish parallelism between the machine frame 4 and the ground or traffic surface 8 or to the horizontal plane or to a predetermined desired milling plane.

Although the invention has been described and illustrated with reference to specific embodiments thereof, it is not intended that the invention be limited to those illustrative embodiments. Those skilled in that art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A self-propelling road milling machine, comprising:
    a machine frame;
    at least two front ground engaging supports, and at least one rear ground engaging support;
    front and rear lifting columns supporting the frame from the ground engaging supports;
    a plurality of position sensors, each of the lifting columns including one of the position sensors so that each position sensor directly detects a lifted condition of its associated lifting column;
    a milling roller supported from the frame for treatment of a ground surface;
    first and second height adjustable side plates arranged on opposite sides of the milling roller;
    a height adjustable stripping plate arranged behind the milling roller and operable to be lowered, during operation, into a milling track generated by the milling roller; and
    a controller operably associated with the position sensors and configured to automatically control the lifted condition of at least one of the lifting columns to establish a predetermined inclination front to rear of the machine frame.

2. The machine of claim 1, wherein:
the predetermined inclination comprises the machine frame being parallel to the ground surface.

3. The machine of claim 1, wherein:
the predetermined inclination comprises the machine frame being parallel to the milling track.

4. The machine of claim 1, wherein:
the predetermined inclination comprises the machine frame being parallel to a predetermined desired milling plane.

5. The machine of claim 1, wherein:
the predetermined inclination comprises the machine frame being parallel to a horizontal plane.

6. The machine of claim 1, wherein:
the controller is configured to determine an inclination of the machine frame from information including position signals from the position sensors associated with the lifting columns.

7. The machine of claim 6, further comprising:
at least one ground engaging sensor other than the ground engaging supports; and
wherein the information further includes information from the at least one ground engaging sensor other than the ground engaging supports.

8. The machine of claim 1, further comprising:
at least one ground engaging sensor other than the ground engaging supports; and
wherein the controller is configured to determine a milling depth of the milling track from the at least one ground engaging sensor.

9. The machine of claim 8, wherein:
the at least one ground engaging sensor other than the ground engaging supports includes the stripping plate.

10. The machine of claim 8, wherein:
the at least one ground engaging sensor other than the ground engaging supports includes at least one of the plates.

11. The machine of claim 8, wherein:
the controller is configured to control both the milling depth and the inclination by controlling the lifted condition of at least one of the lifting columns.

12. The machine of claim 11, wherein:
the controller is configured to establish parallelism between the machine frame and the ground surface at a desired milling depth.

13. The machine of claim 8, wherein:
the controller is configured to determine a milling depth correction in the event the machine frame is not parallel to the ground surface.

14. The machine of claim 1, wherein:
the controller is configured to control the lifted condition of all of the lifting columns to establish the predetermined inclination of the machine frame.

15. The machine of claim 1, wherein:
the controller is further configured such that the at least one lifting column includes the lifting column associated with the at least one rear ground engaging support.

16. A method of controlling a longitudinal inclination of a milling machine, the milling machine having a machine frame, a milling roller supported from the machine frame, front and rear ground engaging supports, and front and rear lifting columns supporting the machine frame from the ground engaging supports, the method comprising:
(a) directly detecting a lifted condition of each of the lifting columns with a position sensor included as part of each respective lifting column;
(b) detecting the longitudinal inclination of the machine frame from information including position signals from the position sensors of the lifting columns; and
(c) automatically controlling the lifted condition of at least one of the lifting columns so as to automatically establish a predetermined longitudinal inclination of the machine frame.

17. The method of claim 16, wherein:
in step (c) the predetermined longitudinal inclination comprises the machine frame being parallel to the ground surface.

18. The method of claim 16, wherein:
in step (c) predetermined longitudinal inclination comprises the machine frame being parallel to the milling track.

19. The method of claim 16, wherein:
in step (c) predetermined longitudinal inclination comprises the machine frame being parallel to a predetermined desired milling plane.

20. The method of claim 16, wherein:
in step (c) predetermined longitudinal inclination comprises the machine frame being parallel to a horizontal plane.

21. The method of claim 16, further comprising:
determining a milling depth of the milling track from at least one ground engaging sensor other than the ground engaging supports; and
wherein in step (b) the information includes information from the at least one ground engaging sensor other than the ground engaging supports.

22. The method of claim 21, further comprising:
controlling both the milling depth and the inclination by controlling the lifted condition of at least one of the lifting columns.

23. The method of claim 11, further comprising:
establishing parallelism between the machine frame and the ground surface at a desired milling depth.

24. The method of claim 11, further comprising:
determining a milling depth correction in the event the machine frame is not parallel to the ground surface.

25. The method of claim 16, wherein:
step (c) further comprises automatically controlling the lifted condition of all of the lifting columns so as to automatically establish the predetermined inclination of the machine frame.

* * * * *